(12) United States Patent
Schroth et al.

(10) Patent No.: US 6,856,142 B2
(45) Date of Patent: Feb. 15, 2005

(54) METHOD FOR DETERMINING AND/OR MONITORING FILLING OF A PRODUCT IN A CONTAINER

(75) Inventors: Herbert Schroth, Schopfheim (DE); Ralf Reimelt, Freiburg (DE); Igor Getman, Lörrach (DE); Stefan Burger, Lüneburg/Ochtmissen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 64 days.

(21) Appl. No.: 10/296,210

(22) PCT Filed: May 19, 2001

(86) PCT No.: PCT/EP01/05768
§ 371 (c)(1),
(2), (4) Date: May 27, 2003

(87) PCT Pub. No.: WO01/92835
PCT Pub. Date: Dec. 6, 2001

(65) Prior Publication Data
US 2004/0046573 A1 Mar. 11, 2004

(30) Foreign Application Priority Data
May 31, 2000 (DE) .......................................... 100 27 228

(51) Int. Cl.⁷ .............................................. G01R 27/32
(52) U.S. Cl. ...................... 324/644; 73/290 R; 342/124
(58) Field of Search ................................ 324/644, 688, 324/697, 699; 73/290 R; 342/124

(56) References Cited

U.S. PATENT DOCUMENTS 3,812,422 A * 5/1974 De Carolis ................. 324/642
4,158,964 A * 6/1979 McCrea et al. ........... 73/290 V
5,781,019 A   7/1998 Telder
6,266,022 B1 * 7/2001 Muller et al. ............... 324/644

FOREIGN PATENT DOCUMENTS

| DE | 4404745 C2 | 8/1995 |
| DE | 19510484 A1 | 10/1996 |
| DE | 19617963 A1 | 11/1997 |
| DE | 19817378 A1 | 10/1999 |
| EP | 0780664 A2 | 6/1997 |
| EP | 0780664 A3 | 1/1998 |
| EP | 0875738 A1 | 11/1998 |
| EP | 0928955 A2 | 7/1999 |

* cited by examiner

Primary Examiner—N. Le
Assistant Examiner—Timothy J. Dole
(74) Attorney, Agent, or Firm—Bacon & Thomas

(57) ABSTRACT

The invention relates to a device for determining and/or monitoring filling of a product or the position of the boundary surface between two media or phases in a container. The device comprises a signal generating unit that generates high-frequency measuring signals, an injection unit and a surface waveguide, wherein the measuring signals are injected into the surface waveguide by means of the injection unit and directed toward the filling product via the surface waveguide. The device also comprises a receiver/evaluation unit, which directly or indirectly determines filling of the product or the position of the boundary surface in the container during the running time of the measuring signals reflected on the surface or boundary surface of the filling product. The invention aims at providing a device which is configured in such a way that parasitic voltages are effectively diverted. This is achieved in that the surface waveguide is connected to a frame potential by means of a coupling.

3 Claims, 6 Drawing Sheets

METHOD FOR DETERMINING AND/OR MONITORING FILLING OF A PRODUCT IN A CONTAINER

FIELD OF THE INVENTION

The invention relates to a device for determining and/or monitoring the fill level of a product, or of the position of the interface between two media or phases in a container, having a signal generating unit generating high-frequency measuring signals, an exciter unit and a surface waveguide, wherein the measuring signals are coupled into the surface waveguide via the exciter unit and are conducted in the direction of the product via the surface waveguide, and having a receiving/evaluating unit, which directly or indirectly determines the fill level of the product, or the position of the interface, by means of the running time of the measuring signals reflected at the surface, or the interface, of the product.

BACKGROUND OF THE INVENTION

Measuring systems which measure various physical values are employed for determining the fill level of a product in a container. The desired information regarding the fill level is subsequently derived from these values. Capacitive, conductive or hydrostatic measuring probes are employed, besides mechanical detectors, as well as detectors operating on the basis of ultrasound, microwaves or radioactive radiation.

Highly accurate measurements of the fill level of fluids or bulk materials in containers (tanks, silos, etc.) are demanded in a multitude of fields, for example in petroleum chemistry, chemistry and food industry. For this reason sensors are employed in increasing numbers there, in connection with which short electromagnetic high-frequency pulses (TDR method or pulse-radar method) or continuous frequency-modulated microwaves (for example FMCW-radar method) are excited in a conductive element, or a waveguide, and are introduced by means of the waveguide into the container in which the product is stored. The known variants of surface waveguides of Sommerfeld or Goubau or Lecher waveguides are possible waveguides.

From a physical point of view, this measuring method makes use of the effect that a portion of the guided high-frequency pulses, or of the guided microwaves, is reflected at the interface between two different media, for example air and oil, or air and water, because of the sudden change (discontinuity) of the dielectric numbers of both media, and is guided back into the receiving unit via the conductive element. The reflected portion (→effective echo signal) is all the greater, the greater the difference in the dielectric numbers of the two media is. The distance to the surface of the product can be determined by means of the running time of the reflected portion of the high-frequency pulses, or the CW signals (echo signals). Knowing the empty distance of the container, it is possible to calculate the fill level of the product in the container. If an interface determination is to be produced, the position of the interface can be determined by means of the measured results.

Sensors with guided high-frequency signals (the signals can be pulses or waves) are distinguished over sensors which freely radiate high-frequency pulses or waves (free-field microwave systems (FMR), or "real radar systems") by a considerably higher echo amplitude. The reason for this is that the output flow takes place quite specifically along the waveguide, or the conductive element. Moreover, in connection with bulk materials with inclined surfaces (conical pile, draw-off funnel) or liquids with moving surfaces (bubbles, eddies, waves), the danger of retro-reflections is ruled out when using guided high-frequency signals.

For performing the measurement, the conductive element is customarily in direct contact with the medium. If it is a medium which can be statically charged, for example bulk material of low electrical conductivity, for example plastic granules or cement (by the way, the static charge is particularly pronounced in case of pneumatic filling), it can occur that static discharges in the measured medium are drawn off via the conductive element in the direction of the signal generating unit, or the receiving/evaluating unit. In that case the danger exists that the electronic and electric parts of the respective units, which are particularly sensitive to voltage peaks, are destroyed. It can occur in the other direction that in case of a defect of the electronic part the full operating voltage of, for example 220 V, is present at the conductive element, which results in an enormous danger for the operators.

SUMMARY OF THE INVENTION

An object of the invention is to provide a device which is designed in such a way that interfering voltages are effectively conducted away.

This object is attained in that the surface waveguide is connected with the ground potential by means of a coupling.

In accordance with an advantageous further development of the device of the invention it is provided that the surface waveguide constitutes the inner conductor and the exciter unit the outer conductor of a coaxial conductor, and that the inner conductor and the outer conductor are of such a size and are designed in such a way that approximately only the base mode is propagated. This is important, since higher modes are radiated at the transition between the exciter unit and the waveguide or are strongly damped on the wave guide. In either case the energy of the measuring signal available for the measurement would be reduced.

Customarily the surface waveguide consists of a substantially cylindrical conductor which terminates concentrically in the exciter unit, which represents the outer conductor. In the case of a coaxial conductor of circular cross section, the base mode is the rotationally symmetrical TEM mode. The next higher mode is the TE11 mode, whose symmetry is distinguished by a reflection plane each for the electrical and magnetic field, which contain the axis of rotation of the inner and outer conductor and are placed perpendicularly on each other. The TE11 mode only starts after a critical wavelength $\lambda_G$, wherein the equation $\lambda_G = 0.5 \pi (d+D)$ approximately applies to the critical wavelength $\lambda_G$. In this case d identifies the diameter of the inner conductor, i.e. the surface waveguide, and D the diameter of the outer conductor, i.e. the exciter unit. To prevent the propagation of higher modes, the two diameters are selected, at least in that area of excitation in which there is no rotational symmetry, in such a way that the smallest wavelength contained in the high-frequency measuring signal is greater than the critical wavelength $\lambda_G$ for the TE11 mode. Thus, no higher modes can be propagated in the areas of reduced symmetry of the exciter unit. In those areas of the exciter unit in which higher modes are capable of being propagated because of the greater diameter, rotational symmetry prevails, so that no higher modes are excited.

The cross section of the outer conductor advantageously widens toward the surface waveguide in the area of the exciter unit. By means of this it is possible to achieve good impedance adaptation and little field distortion in the transition area. The latter reduces the danger of higher modes being excited, the former reduces the danger that undesired reflections of the measuring signal occur.

A first preferred embodiment of the invention proposes that the exciter unit has at least one lateral wall and a rear wall, wherein the measuring signals are conducted through an opening in the rear wall of the exciter unit from the signal generation unit into the exciter unit, or from the exciter unit into the receiving unit. In this connection it is particularly advantageous if the coupling which connects the surface waveguide with ground potential is a stub line conducted through the lateral wall of the exciter unit and extending substantially parallel with the plane in which the rear wall of the exciter unit is located. Voltage transients are still effectively conducted away through the stub line if, for example in connection with service work on the device, the signal generation unit and/or the receiving/evaluating unit are separated from the exciter unit and the conductive element, or the surface waveguide. Or, expressed in different words: by attaching the coupling, or the stub line, to the sensor side of the fill level sensor it is prevented that the latter, when it is removed from the electronic element, constitutes an insulated capacitance in respect to the surroundings. By means of this a discharge is prevented, in particular in explosion-prone areas, which could result in the ignition of the atmosphere capable of exploding.

Moreover, it is particularly advantageous if the length of the stub line essentially is lambda/4, wherein lambda corresponds to the center frequency of a high-frequency measuring signal. If parasitic effects are present, it is quite possible for the optimal length to differ from lambda/4 and is, for example, lambda/6 or lambda/8. The center frequency can be 5.8 GHz, for example. If the length of the stub line (or of another type of coupling) meets the above mentioned condition, a short circuit is transformed into an open circuit. In the ideal case no reflections then occur in the area of the coupling toward ground and the entire measuring signal, as well as the signal reflected from the fill level in turn, is transmitted. Because of the increased transmission, the echo signals achieve maximum amplitudes. Because of the reduced reflection the block distance, i.e. the distance in which a reliable determination of the fill level is impossible because the echo signals disappear in the interference signals, is reduced. It is therefore possible to increase the measuring range by means of the previously described further development of the device of the invention, and the measuring sensitivity can be increased.

The short circuit in this embodiment as well as with all other variants is preferably designed in such a way that the coupling can absorb a current surge of a predetermined minimum size. The minimum value is such that, one the one hand, it can meet the high demands made of measuring apparatus in the ex range; on the other hand the short circuit is designed in such a way that the contact voltages at the surface waveguide remain below the prescribed values, even in case of an error in the electronic measuring device.

An alternative embodiment provides for the stub line to be provided outside of the exciter unit, for example in the plug of the feed line or on the electronic board on which the signal generating unit and/or the receiving/evaluating unit are arranged. The arrangement of the short circuit on the electronic board can be realized in a very cost-effective way, while the arrangement in the plug of the feed line offers advantages in mounting.

In accordance with a second advantageous embodiment of the device of the invention the exciter unit has at least one lateral wall and a rear wall, wherein the measuring signals are conducted via a coupling, which is passed through an opening in the lateral wall or the rear wall, from the signal generating unit to the surface waveguide, or from the surface waveguide to the receiving unit, wherein the rear wall of the exciter unit is connected to the ground potential and the rear wall and the surface waveguide are connected with each other in an electrically conducting manner. This arrangement is distinguished by a high mechanical stability since the tensile forces on the waveguide, which occur in particular in connection with bulk materials, are exclusively absorbed by metallic parts.

Alternative embodiments of the solution in accordance with the invention provide for the coupling of the measuring signal to the waveguide to be substantially an electrically conducting connection, or that the coupling is a guide structure with an open circuit or it is short-circuited to ground, for example a coupling pin or a coupling loop. The guide structure which is an open circuit or short-circuited to ground is arranged in such a way that the coupling of the measuring signals to the surface waveguide takes place either essentially inductively or essentially capacitively. By the way, the guide structure is embodied in a U- or Ω-shape.

It is furthermore particularly advantageous if the galvanic, inductive or capacitive coupling is arranged in such a way that the area of maximum electrical coupling has a distance from the rear wall of approximately lambda/4, wherein lambda corresponds to the center frequency of a measuring signal. By means of this the short circuit of the surface waveguide is again transformed into an open circuit, and the reflection of the measuring signal is minimized by this.

BRIEF DESCRIPTION OF THE DRAWINGS

The invention will be explained in greater detail by means of the following drawings. Shown are:

FIG. 1, an embodiment of the device in accordance with the invention, wherein the device is partially shown in longitudinal section, FIG. 2, a cross section through a plug with a stub line, FIG. 3, a perspective plan view of the plug represented in FIG. 2, FIG. 4, a schematic representation (longitudinal section) of a galvanic coupling, wherein the measuring signals are coupled in through the lateral wall of the exciter unit, FIG. 5, a schematic representation (longitudinal section) of a capacitive coupling, wherein the measuring signals are coupled in through the lateral wall of the exciter unit, FIG. 6, a schematic representation (longitudinal section) of an inductive coupling, wherein the measuring signals are coupled in through the lateral wall of the exciter unit, FIG. 7a, a schematic representation (longitudinal section) of a coupling via a coupling pin, FIG. 7b, the representation shown in FIG. 7a in cross section, FIG. 8a, a schematic representation (longitudinal section) of a coupling with an open circuit conductor structure, which is embodied in the shape of a semicircle, FIG. 8b, the representation shown in FIG. 8a in cross section, FIG. 9a, a schematic representation (longitudinal section) of a coupling via a coupling loop, which is short-circuited to the ground, FIG. 9b, the representation shown in FIG. 9a in cross section, FIG. 10a, a schematic representation (longitudinal section) of a coupling by means of a second embodiment of a coupling loop, FIG. 10b, the representation shown in FIG. 10a in cross section, and FIG. 11, a schematic representation of a short circuit in the circuit of the electronic portion of a fill level sensor.

DESCRIPTION OF THE PREFERRED EMBODIMENT

Figure 1:
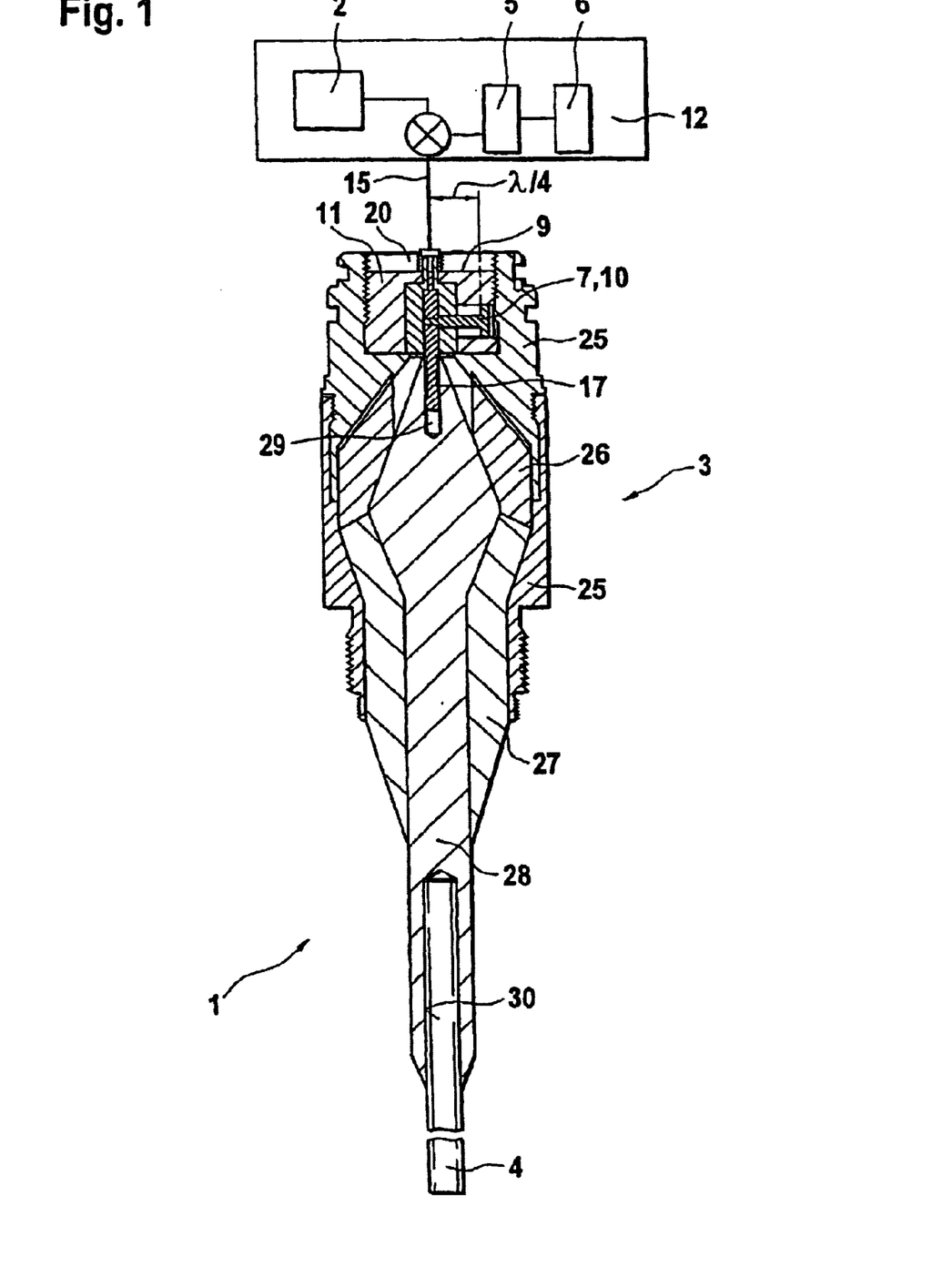

A preferred embodiment of the device in accordance with the invention is represented in FIG. 1, wherein the device can be partially viewed in longitudinal section. In this case the coupling between the fill level sensor 1 and ground is realized here by means of a stub line 10, which is provided in the plug 11. It is of course also possible to conduct the stub line 10 directly through the holder 25 of the exciter unit 3 to the conductive element 28.

The fill level sensor 1 is composed of an exciter unit 3, through which the measuring signals are coupled from the signal generating unit 2 to the surface waveguide 4. In the represented case coupling takes place through the rear wall 9 of the exciter unit 3. A short circuit is realized—as already mentioned—via a stub line 10 arranged laterally in the plug 11. For the reasons already mentioned previously, the length of the stub line 10 is preferably lambda/4, wherein lambda corresponds to the center frequency of a measuring signal.

The exciter unit 3 has a special design. By means of this design it is possible, for one, to achieve a sufficient stability of the fill level sensor 1; on the other hand the reflected portion of the measuring signals is kept as low as possible by means of the flowing transitions inside the exciter unit 3. The exciter unit 3 is embodied to be completely rotationally symmetrical—the symmetry is only less in the area of the stub line 10. There the diameters d of the inner conductor and D of the outer conductor are so small that with the signal frequencies used, no higher modes are capable of being propagated. In the area of the thickening of the conductive element 28—wherein the thickening is used for holding the surface waveguide 4—the diameters for achieving maximum tensile load-bearing capacity can be selected without problems to be so large that in principle higher modes are capable of being propagated. Even in that case higher modes are not excited in this area because of the rotational symmetry.

The exciter unit 3 is arranged on a holder 25 which is connected to ground potential. The conductive element 28, which is spaced apart from the holder 25 by means of the dielectric elements 26, 27, is located in the center area of the exciter unit 3, or of the holder 25. The measuring signals are conducted from the signal generating unit 2 to the surface waveguide 4, or from the surface waveguide 4 to the receiving unit 5, via a plug 11 and a coaxial cable 15, which is connected with the connecting element 16 on which, in the case represented, an SMA plug can be screwed. In the represented example the signal generating unit 2, the receiving unit 5 and the evaluating unit 6 are arranged on an electronic board 12.

To achieve a stable connection between the surface waveguide 4 and the exciter unit 3, the upper end area of the surface waveguide 4 is pushed into the center recess 30 in the lower end area of the conductive element 28. The mechanical and electrical contact between the two elements 3, 4 is preferably achieved by means of pressing.

Figure 3:
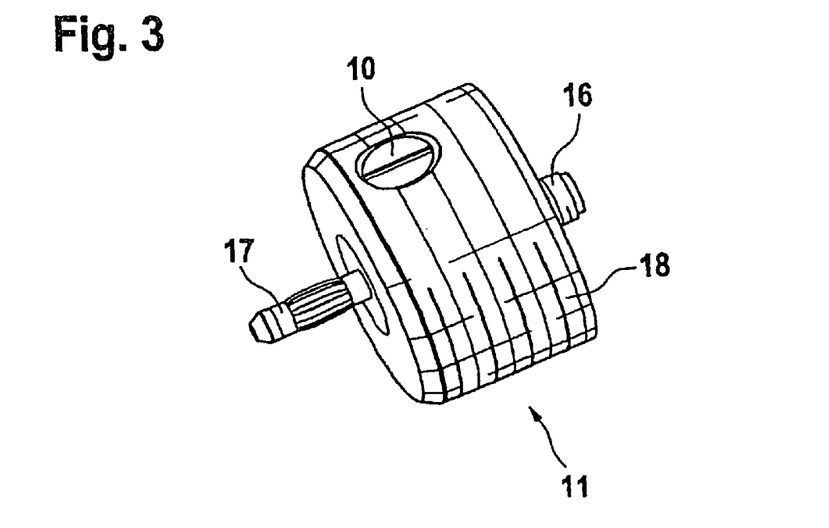

In accordance with the embodiment represented in FIG. 1, the surface waveguide 4 is connected with the ground potential in the area of the plug 11. The short circuit is realized via the stub line 10. The plug 11 with the integrated stub line 10 is releasably connected with the exciter unit 3. The conducting contact of the coaxially cable 15 with the exciter unit 3 is disrupted, or established, by pulling out, or inserting, the contact pin 17 of the plug 11 into the corresponding centered recess 29 in the upper area of the conductive element 28. Resilient elements 19 are provided on the contact pin 17 for assuring dependable holding and contact. As can be seen in FIG. 3, the stub line 10 is realized by means of a screw extending through the lateral wall of the housing 18 of the plug 11, is soldered to this housing and is in direct contact with the contact pin 17.

Figure 2:
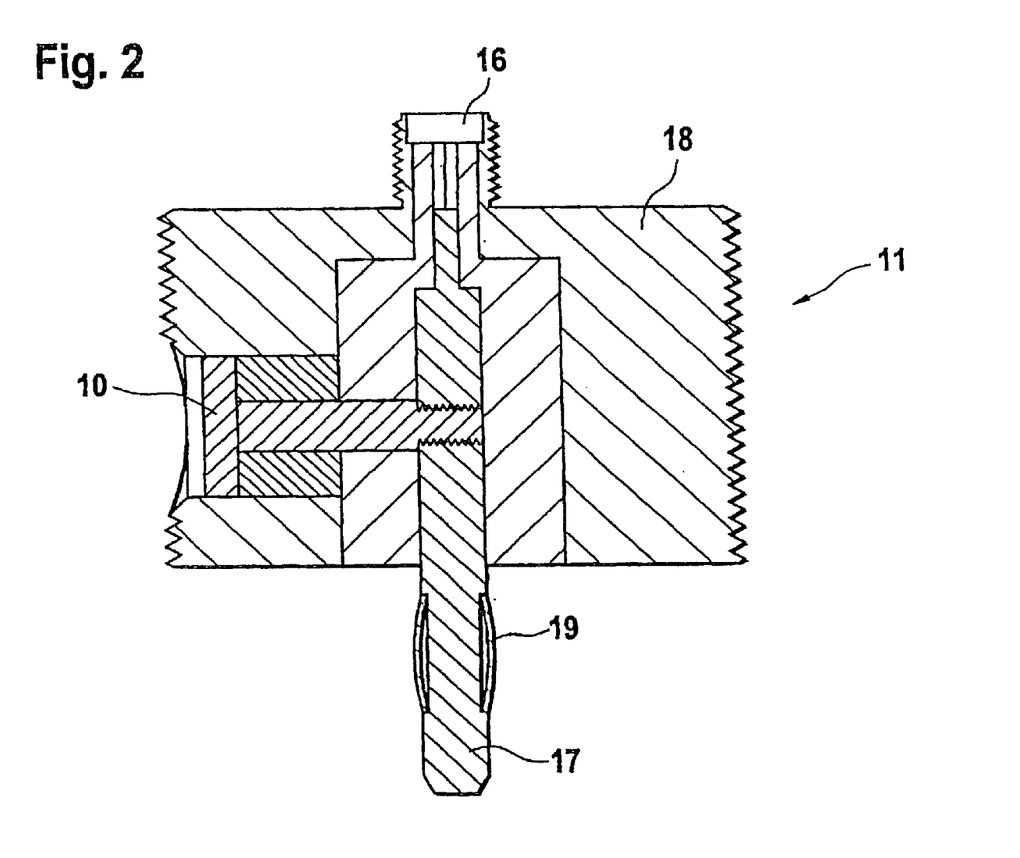

The plug 11 has again been represented in detail in FIGS. 2 and 3. FIG. 2 shows a cross section through the plug 11 in which the stub line 10 is positioned; in FIG. 3 the plug 11 is shown in a perspective plan view.

Figure 4:
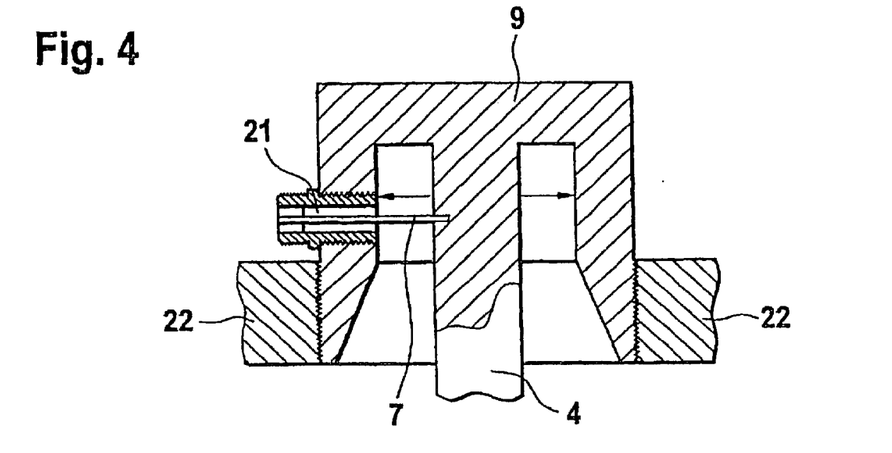
Figure 5:
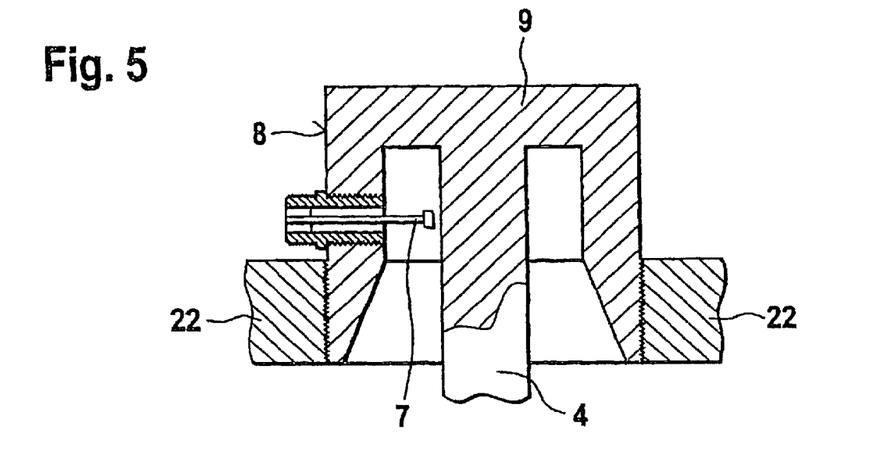
Figure 6:
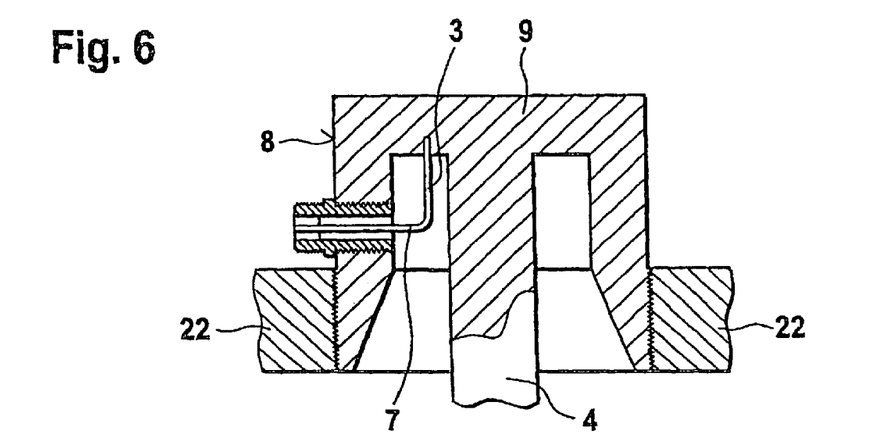

FIG. 4 shows a schematic representation (longitudinal section) of an exciter unit 3 with a galvanic coupling, wherein the measuring signals are coupled in through the lateral wall 8 of the exciter unit 3 to the conductive element 28. The variations represented in FIG. 5 and FIG. 6 merely differ from the solution represented in FIG. 4 by the manner of coupling the measuring signals into the conductive element 28. Capacitive coupling in by means of the electric field is represented in FIG. 5, while FIG. 6 shows an inductive coupling in via the magnetic field induced into the conductor loop.

Figure 7A:
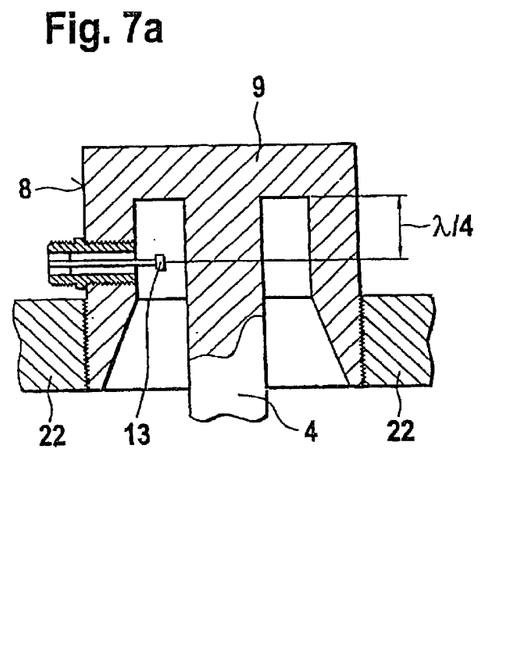
Figure 7B:
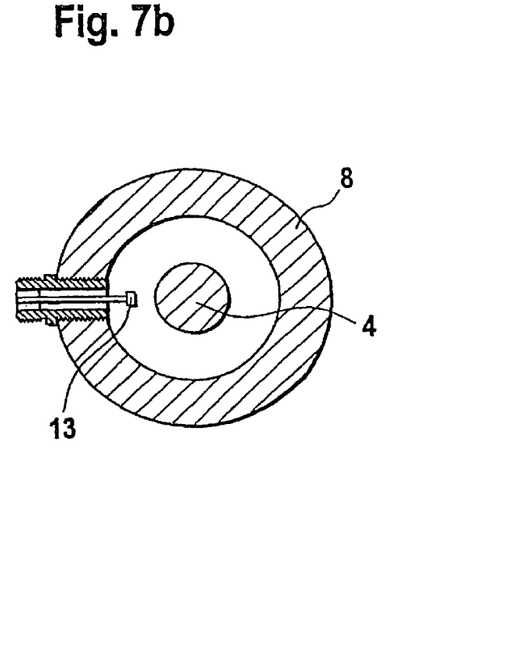
Figure 8A:
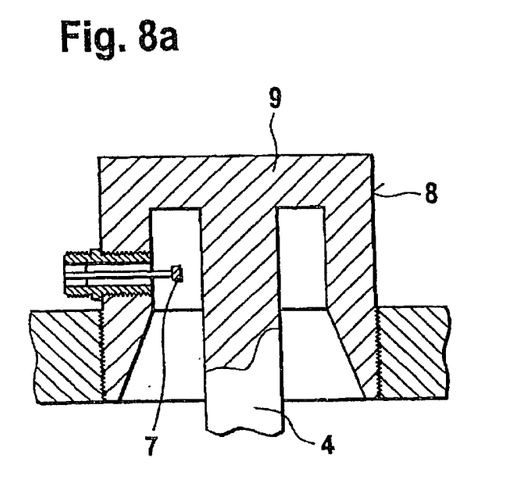
Figure 8B:
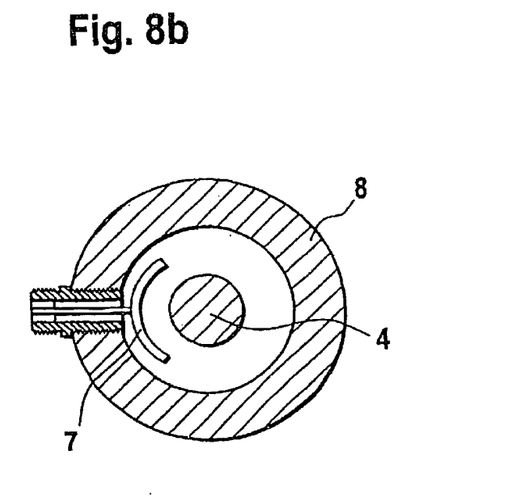
Figure 9A:
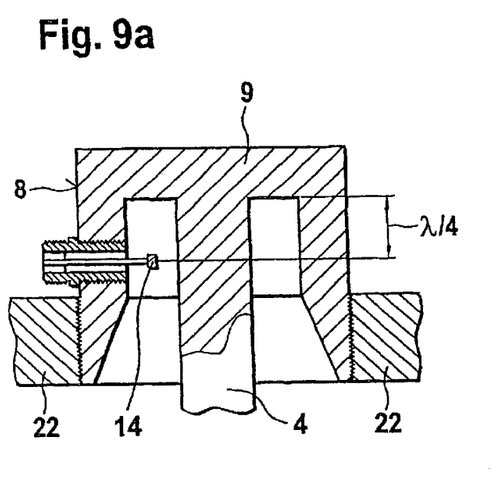
Figure 9B:
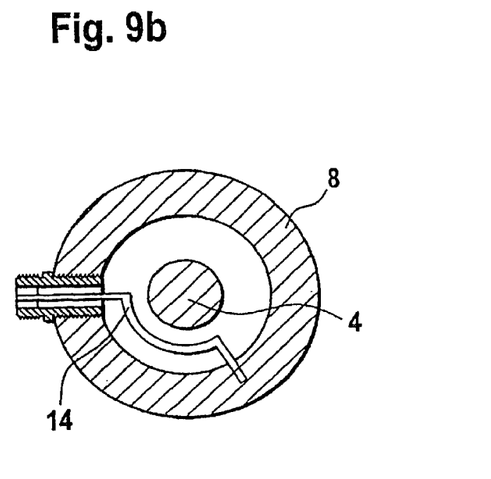
Figure 10A:
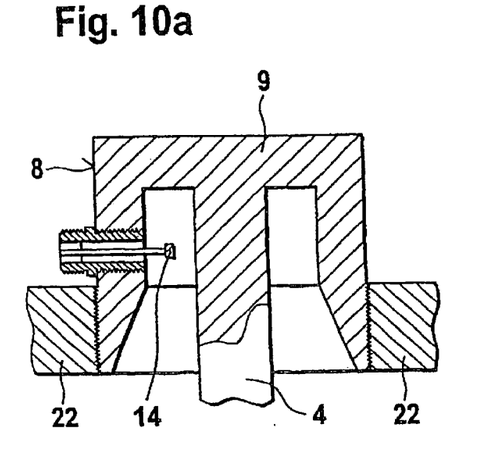
Figure 10B:
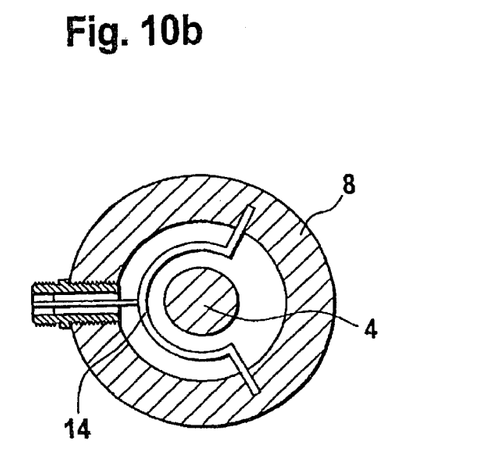

In all three cases the surface waveguide 4 is directly connected with the rear wall 9 of the exciter unit 3 (possibly by means of a conductive element 28) and is therefore connected to ground. The measuring signals are coupled into the surface waveguide 4 via a coupling 7 through the lateral wall 8 of the exciter unit 3. The coupling is, for example, a coupling pin 13 or a coupling loop 14. Examples of how such coupling pins 13 or coupling loops 14 can be designed can be seen in FIG. 7a, FIG. 7b, FIG. 8a, FIG. 8b, FIG. 9a, FIG. 9b, FIG. 10a, FIG. 10b. While each of the figures identified by (a) shows a longitudinal section through the embodiment, a cross section is represented in the corresponding figure identified by (b). While in the solutions represented in FIG. 7 and FIG. 8 the coupling pin 13, or the coupling 7 do not have a direct contact with the lateral wall 8, or the holder 25, in the variations represented in FIG. 9 and FIG. 10 the coupling loop 14 is contacted in its end area with the lateral wall 8, or the holder 25, of the exciter unit 3.

For suppressing the excitation of undesired higher modes, the galvanic, inductive or capacitive coupling 7 is preferably arranged at a location at which the diameters of the inner conductor 4 and the outer conductor 8 are so small that these higher modes are incapable of propagation.

The coupling 7 of the measuring signal is preferably arranged in such a way that the range of maximum electrical coupling has an approximate distance from the rear wall 9 of lambda/4; lambda again corresponds here to the center frequency of a measuring signal. The short circuit of the surface waveguide is then transformed into an open circuit, and the reflection of the measuring signal is minimal.

For protection against dirt or corrosion it is of course possible to fill the exciter unit 3 completely or partially with a dielectric material.

Figure 11:
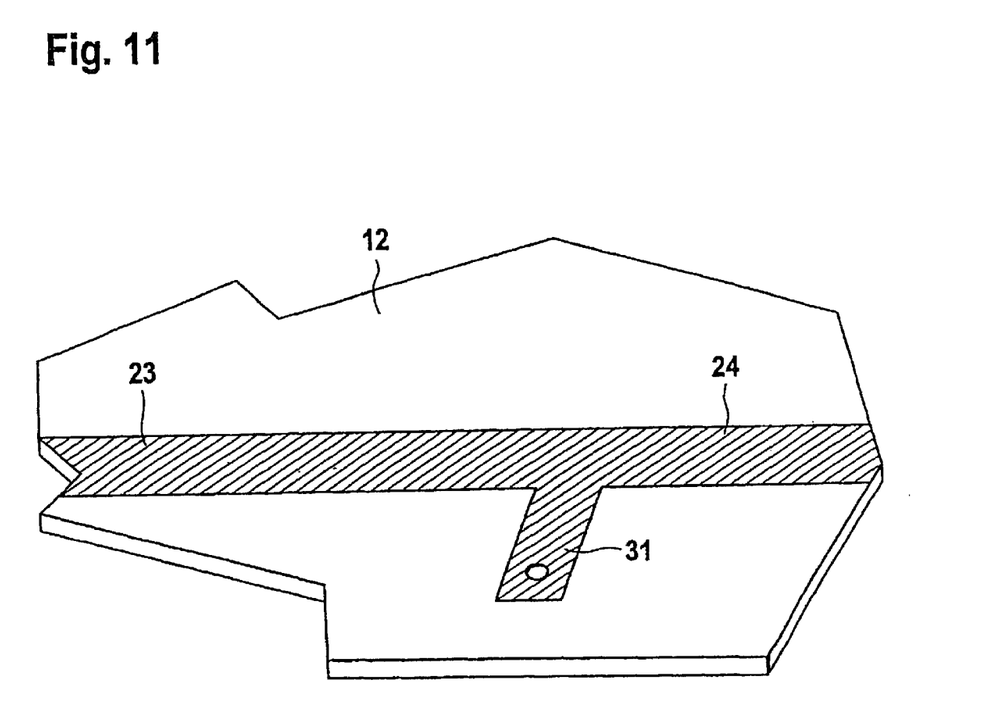

FIG. 11 shows a schematic representation of a short circuit on the electronic board 12 on which the signal generating unit 2 and/or the receiving and evaluating unit 5, 6 are arranged. In the simplest case, the short circuit is again accomplished via a stub line 31. Microwave circuits are customarily produced in accordance with micro-strip conductor technology. In that case the electronic board 12 consists of a dielectric substrate with continuous base metallization on the one side and strip conductors on the other side. Other technologies, such as the coplanar conductor, slit conductor or triplate, can of course also be employed. The only requirement for their applicability is that a low frequency short circuit, which does not interfere with high-frequency techniques, can be realized through the conductor.

If—as in the represented case—micro-strip conductor technology is employed, in the simplest case the stub line 31 is contacted through to the base metallization of the electronic board 12. The stub line 31 branches laterally off the conductor 23, or the conductor 24, wherein the conductor 23 represents the feed line to the circuit of the signal generating unit 2 and/or receiving/evaluating unit 5, 6, while the conductor 24 represents the feed line to the coupling 7.

What is claimed is:

1. A device for determining and/or monitoring the fill level of a product, or of the position of the interface between two media or phases in a container, comprising:

a signal generating unit generating high-frequency measuring signals;

an exciter unit;

a surface waveguide;

a coupling; and a receiving/evaluating unit, which directly or indirectly determines the fill level of the product, or the position of the interface by means of the running time of the measuring signals reflected at the surface, or the interface, of the product, wherein:

the measuring signals are coupled into said surface waveguide via said exciter unit and are conducted in the direction of the product via said surface waveguide; and said surface waveguide is connected with the ground potential by means of said coupling.

2. The device as defined in claim 1, wherein:

said surface waveguide constitutes an inner conductor, said exciter unit, and an outer conductor of a coaxial conductor; and the inner conductor and the outer conductor are dimensioned and designed in such a way that approximately only the base mode is excited.

3. The device as defined in claim 1, said exciter unit has at least one lateral wall and one rear wall; and the measuring signals are conducted through an opening in said rear wall from said signal generating unit into said exciter unit, or from said exciter unit into said receiving unit.

* * * * *